(12) United States Patent
Ames et al.

(10) Patent No.: US 10,776,133 B2
(45) Date of Patent: Sep. 15, 2020

(54) PREEMPTIVE LOADING OF CODE DEPENDENCIES FOR IMPROVED PERFORMANCE

(71) Applicant: salesforce.com, inc., San Francisco, CA (US)

(72) Inventors: Robert Ames, Sunnyvale, CA (US); Xiaoyi Chen, Sunnyvale, CA (US); Hiro Inami, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/880,352

(22) Filed: Jan. 25, 2018

(65) Prior Publication Data

US 2019/0227815 A1    Jul. 25, 2019

(51) Int. Cl.
    *G06F 9/44*        (2018.01)
    *G06F 9/445*     (2018.01)
    *G06F 8/61*       (2018.01)
    *H04L 29/08*     (2006.01)

(52) U.S. Cl.
    CPC ............ *G06F 9/44505* (2013.01); *G06F 8/61* (2013.01); *H04L 67/2847* (2013.01); *H04L 67/2842* (2013.01)

(58) Field of Classification Search
    CPC .................................................. G06F 9/44505
    USPC ........................................................ 717/120
    See application file for complete search history.

(56) References Cited

U.S. PATENT DOCUMENTS

| 6,314,561 | B1* | 11/2001 | Funk | G06F 8/4442 |
| | | | | 711/137 |
| 10,009,439 | B1* | 6/2018 | Kolam | H04L 67/2847 |
| 2004/0015952 | A1* | 1/2004 | Lajoie | G06F 8/65 |
| | | | | 717/171 |

(Continued)

OTHER PUBLICATIONS

Eazfuscator.net, "Code Virtualization", Jul. 2014, https://web.archive.org/web/20140726104128/http://www.gapotchenko.com/eazfuscator.net/about (Year: 2014).*

(Continued)

*Primary Examiner* — Wei Y Zhen
*Assistant Examiner* — Lanny N Ung
(74) *Attorney, Agent, or Firm* — Holland & Hart LLP

(57) ABSTRACT

Methods, systems, and devices for preemptively loading code dependencies are described. In some systems, an application server—which may be a software component of a user device—may perform a loading process for an application framework module (e.g., based on receiving an execution request for a corresponding application). To reduce the latency of loading the framework module, the application server may perform one or more preemptive non-framework network requests to retrieve code dependencies for the framework or the application code. These requests may be sent prior to the framework loading process, or in parallel with the framework loading process. The application server may receive the code dependencies in response, and may store these dependencies in a memory cache. When the framework loading process needs these code dependencies, the application server may efficiently access the dependencies locally in the memory cache rather than remotely requesting the dependencies over the network.

20 Claims, 12 Drawing Sheets

(56) References Cited

U.S. PATENT DOCUMENTS

| | | | |
|---|---|---|---|
| 2006/0075394 A1* | 4/2006 | Iwamoto | G06F 9/44521 |
| | | | 717/162 |
| 2008/0215426 A1* | 9/2008 | Guldimann | G06Q 30/02 |
| | | | 705/14.61 |
| 2010/0057905 A1* | 3/2010 | Enscoe | G06F 11/302 |
| | | | 709/224 |
| 2012/0278431 A1* | 11/2012 | Luna | G06F 9/5027 |
| | | | 709/217 |

OTHER PUBLICATIONS

Computer Hope, "Application server", Oct. 2, 2017, https://www.computerhope.com/jargon/a/appserve.htm (Year: 2017).*

* cited by examiner

PREEMPTIVE LOADING OF CODE DEPENDENCIES FOR IMPROVED PERFORMANCE

FIELD OF TECHNOLOGY

The present disclosure relates generally to database systems and data processing, and more specifically to preemptive loading of code dependencies for improved performance.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support users running applications, such as CRM applications, on user devices. In order to run an application at a user device, an application server associated with the user device may first need to load the application code, a framework for the application code, and any dependencies (e.g., dependent code, data, network requests, etc.) for the application code and the framework. However, loading the code dependencies may introduce a large amount of latency (e.g., on a scale of seconds or milliseconds) before the application code is available for execution due to the imbedded dependencies within an application or framework loading process. For example, the framework loading process may include a chain of sequential loads for code dependencies, where any further loading functionality may not occur until the code dependencies are loaded (e.g., remotely over a network).

DETAILED DESCRIPTION

Figure 1:
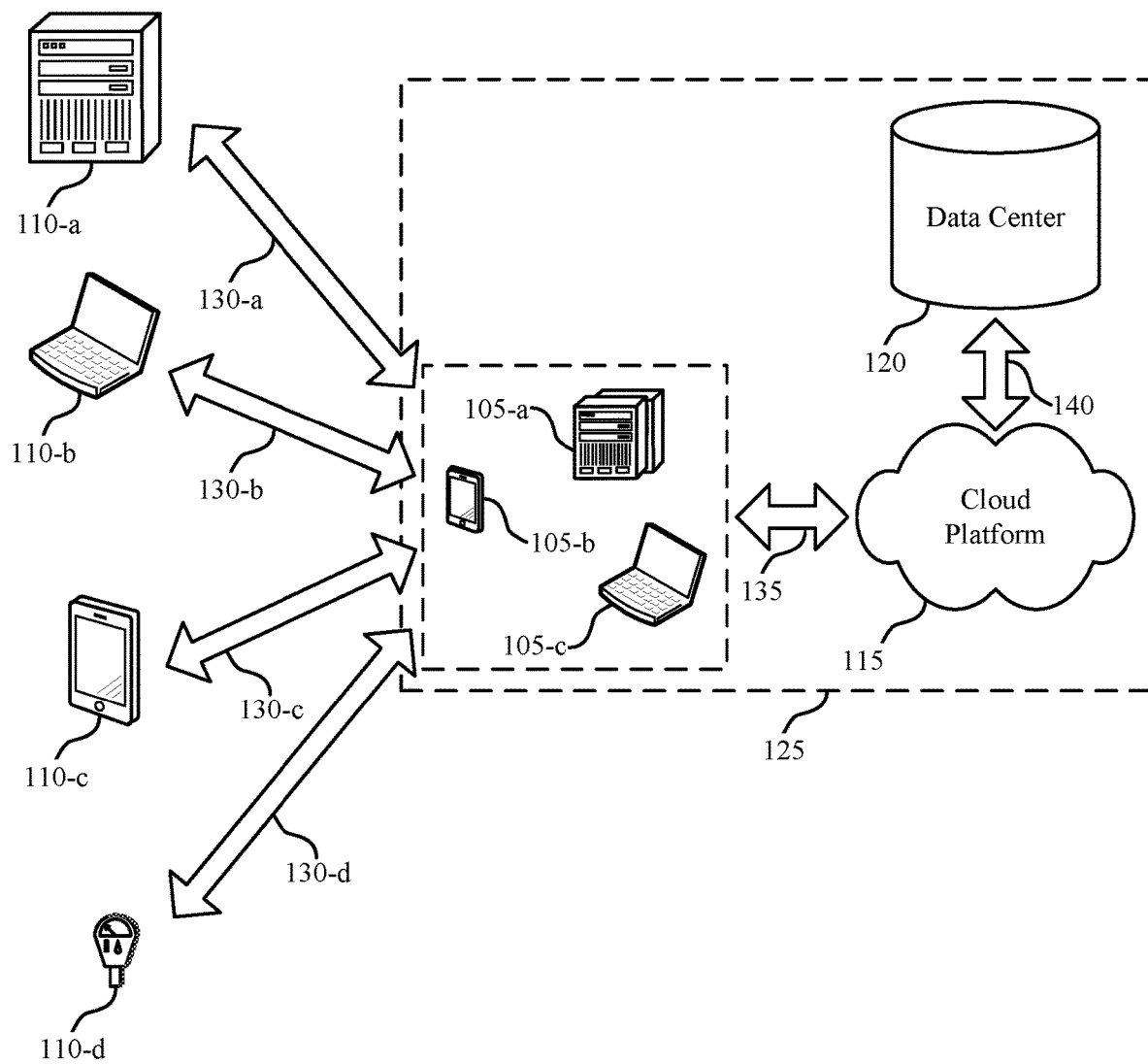
FIG. 1 illustrates an example of a system for preemptively loading code dependencies at an application server that supports preemptive loading of code dependencies for improved performance in accordance with aspects of the present disclosure.

In some systems, an application server—which may be an example of a software component of a user device—may support running applications (e.g., customer relationship management (CRM), analytics, or any other types of applications) for a user. To run an application, the application server may execute corresponding application code, which may depend upon an application framework module or any other code dependencies (e.g., coding libraries, permissions, user data, etc.). Accordingly, to execute the application code, the application server may first need to load the application code, the framework module, the code dependencies, or any combination of these. Rather than perform a sequential loading process for the different codes and code dependencies, the application server may utilize preemptive loading techniques to reduce the latency involved in making the application code available for execution.

For example, the application server may retrieve the code dependencies remotely over a network. In some cases, the application server may perform the remote network requests for the code dependencies as part of the loading process for the framework (e.g., the framework bootstrap process) or the application code (e.g., the application bootstrap process). However, waiting to receive the code dependencies over the network may introduce large amounts of latency into these loading processes. Instead, the application server may perform remote resource network requests outside of the framework code or bootstrapping. In some implementations, the application server may simultaneously perform loading processes for the framework code, application code, or both while sending non-framework requests to retrieve the code dependencies over the network (e.g., from a code dependency store). In other implementations, the application server may receive an indication of code dependencies to load prior to initiating an application loading process, and may automatically perform preemptive loading of the code dependencies. In either implementation, the application server may receive the requested code dependencies, and may store the code dependencies in a local memory cache. When the framework or application bootstrapping process reaches a request for the code dependencies (e.g., a framework request), the application server may "intercept" the request (e.g., the application server may not send the request over the network), and instead may access the code dependencies locally within the memory cache. Retrieving the code dependencies locally within the application server during the framework or application bootstrapping process—as opposed to retrieving the dependencies remotely over the network at this point in the process—may improve the time overhead for the framework and application loading processes. Accordingly, the application server may make the application code available for user execution sooner by implementing preemptive loading of code dependencies.

Aspects of the disclosure are initially described in the context of an environment supporting an on-demand database service. Additional aspects of the disclosure are described with reference to a system architecture, code dependencies, loading processes, and process flows. Aspects of the disclosure are further illustrated by and described with reference to apparatus diagrams, system diagrams, and flowcharts that relate to preemptive loading of code dependencies for improved performance.

FIG. 1 illustrates an example of a system 100 for cloud computing that supports preemptive loading of code dependencies for improved performance in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, the cloud platform 115, data center 120, or a combination of the two may support running applications for cloud clients 105 or contacts 110. For example, a cloud client 105 may be an example of an application server, or may be an example of a user device containing an application server as component software. In order to run an application, the application server may execute application code (e.g., code related to one or more application functions). In some cases, in order to execute the application code, the application server may need to first load framework code (e.g., code required prior to use of the application code) and any other coding dependencies of the application code.

Instead of loading application code dependencies in sequence as part of a sequential loading process for any dependent frameworks or APIs, the application server may load the code dependencies prior to or in parallel with the loading processes for the dependent frameworks or APIs. This technique may result in an improvement in perceived user performance and a decreased time waiting to load and process (e.g., make available and then use) the application code by a user. Once the application code is available to accept user commands or inputs, the user may execute the application code within a user system (e.g., where the user system may refer to other code executable by the user to accomplish one or more tasks).

Figure 2:
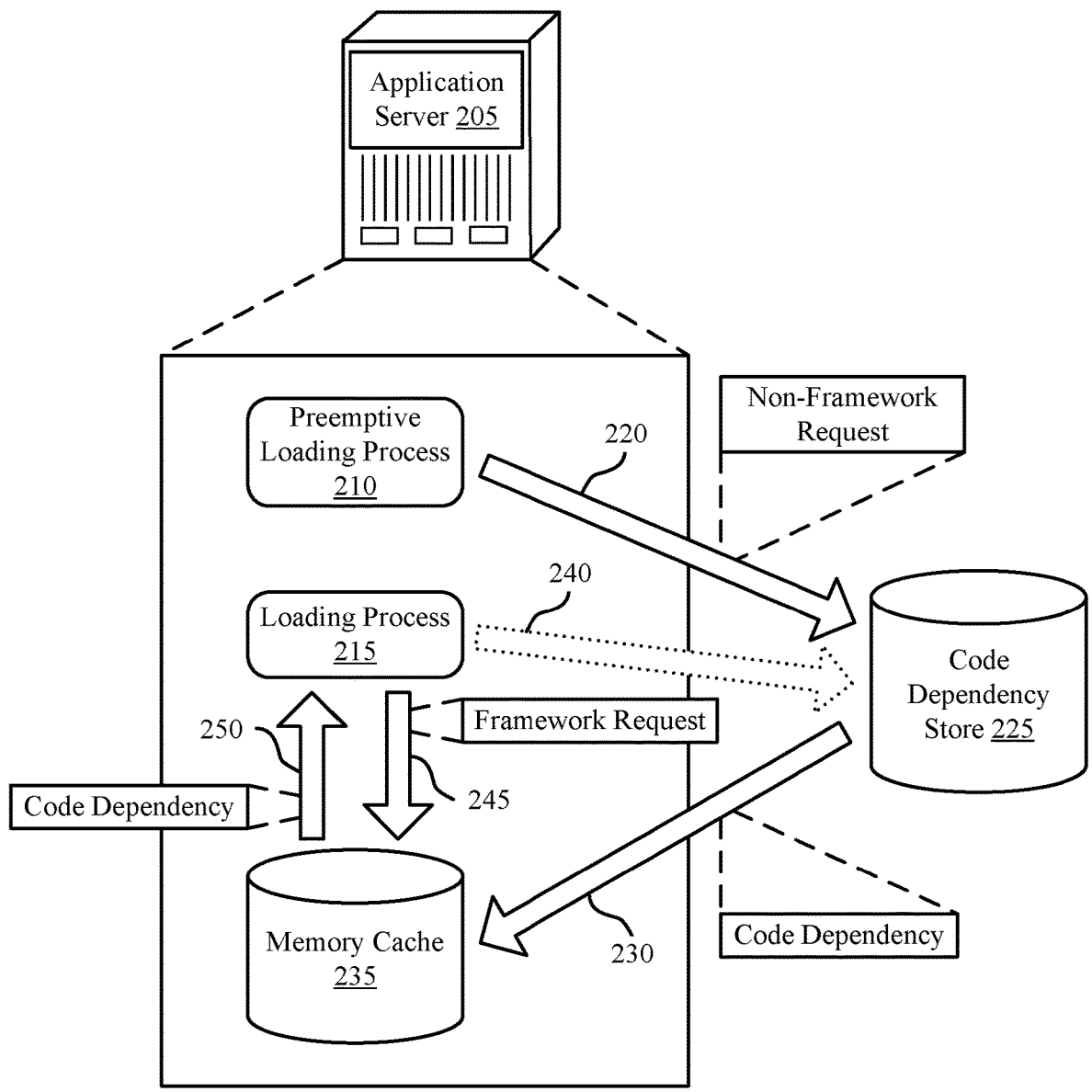
FIG. 2 illustrates an example of a system architecture that supports preemptive loading of code dependencies for improved performance in accordance with aspects of the present disclosure.

FIG. 2 illustrates an example of a system architecture 200 that supports preemptive loading of code dependencies for improved performance in accordance with aspects of the present disclosure. The system architecture 200 may include an application server 205 and a code dependency store 225, which may be examples or components of the cloud clients 105, contacts 110, cloud platform 115, or data center 120 as described above with reference to FIG. 1. The application server 205 may be an example of any system software or combination of software and hardware that supports application code. For example, the application server 205 may be an example of a user device component, a stand-alone server, a server cluster, or any similar device or software module that handles code at runtime (e.g., in any number of supported computer programming languages). The application server 205—or a corresponding user device, such as a cloud client 105 or contact 110—may perform a loading process 215 for code, where the application server 205 may preemptively load code dependencies to improve the efficiency and user-facing performance of the loading process 215. For example, by implementing the system architecture 200, the application server 205 may improve the wall-clock time (e.g., the elapsed real time) of the loading process 215 for application code, reducing the latency between initiating loading of the code and having the corresponding application available at a user device or server for execution.

The application server 205 may perform a preemptive loading process 210 associated with a loading process 215. For example, the loading process 215 may correspond to loading application code related to application functions, loading framework or library code related to common functionalities available across applications, or loading some combination of these codes. In some cases, the loading process 215 may correspond to loading a framework module (e.g., an application framework), which may include framework code, library code, or any combination of these or other codes for the system to load in support of the application code. The preemptive loading process 210 may correspond to loading code dependencies for the application code, framework code, library code, or any combination of these codes. These code dependencies may be examples of dependent code, dependent files, or user data to be used in the loading process 215, or network activity to be performed for the loading process 215. Accordingly, performing the loading process 215 may be dependent upon loading these code dependencies. In some cases, a user may have permissions to modify the application code, but may not have permissions to modify the framework module or code dependencies.

To efficiently load the code dependencies, in some cases, the application server 205 may begin the preemptive loading process 210 prior to performing the loading process 215. In other cases, the application server 205 may perform the loading process 215 and the preemptive loading process 210 simultaneously (e.g., the preemptive loading process 210 and the loading process 215 may overlap in time for at least a portion of the processing). The loading process 215 may involve loading the application framework (e.g., a framework module) to support executing the application. Loading the application framework may involve the application server 205 performing a set of framework techniques. Additionally, loading the application framework may depend on one or more code dependencies, including dependent code or dependent data. To improve the efficiency of the loading process 215, the application server 205 may implement one or more non-framework techniques to load the code dependencies outside of the framework loading process. In this way, the application server 205 may bypass one or more layers of sequential access. In some systems, loading the application framework may involve loading one or more code dependencies in sequence with one or more framework-specific loading processes. In contrast, the system architecture 200 may support the application server 205 loading the code dependencies prior to loading the application framework, or loading the code dependencies in parallel with each other, in parallel with performing the one or more framework-specific loading processes, or both. The application server 205 may then provide these code dependencies to the application framework, while blocking execution of the application until the code dependencies and application framework are successfully loaded.

To perform the preemptive loading process 210 for the code dependencies, the application server 205 may send one or more non-framework requests at 220 to a code dependency store 225. In some cases, the code dependency store 225 may be an example of a database storing dependent code (e.g., code to import for the application framework or the application code). In other cases, the code dependency store 225 may be an example of a backend server or a user device that can supply the application server 205 with dependent data (e.g., security credentials). These non-framework requests may be examples of remote resource network requests, such as fetching methods (e.g., using a fetching application programming interface (API), such as window.fetch), data retrieval requests using an object for server interaction (e.g., an XMLHttpRequest (XHR)), or any other request to retrieve code dependencies implemented outside of the framework loading process.

Based on the non-framework requests, the code dependency store 225 may return the requested code dependencies to the application server 205 at 230. The application server 205 may store the retrieved code dependencies in a local memory cache 235. The application server 205 may use this local memory cache 235 to support the loading process 215 for the application framework.

For example, the loading process 215 may include framework requests for the code dependencies retrieved using the preemptive loading process 210. These framework requests may also be examples of remote resource network requests. However, as the application server 205 may already store the loaded code dependencies in the memory cache 235, the application server may not send a request over the network to a remote resource in order to retrieve the code dependencies for the application framework (e.g., as illustrated at 240). Instead, the application server 205 may serve arbitrary data to the loading process 215 in response to the framework network request. For example, at 245, the application server 205 may determine whether the memory cache 235 contains the code dependencies corresponding to the framework requests. If the code dependencies are stored in the local memory cache 235—for example, based on the preemptive loading process 210—the application server 205 may use the locally stored code dependencies for the loading process 215 at 250. In this way, the loading process 215 may retrieve the code dependencies locally, rather than over the network, reducing the latency associated with loading the code dependencies.

In many examples, when the application code is ready at the application server 205, the application server 205 may have finished loading the code dependencies based on the preemptive loading process 210. However, in some examples, at 245, the application server 205 may determine that one or more code dependencies are not stored in the local memory cache 235. The application server 205 may include a failsafe mechanism to block further execution of application bootstrap code (e.g., code used in the application loading process) until these code dependencies are loaded. In some cases, the application server 205 may pause the loading process 215 until the one or more missing code dependencies are received at the application server 205. The application server 205 may then resume the loading process 215 using these code dependencies. Additionally or alternatively, the application server 205 may transmit—or retransmit—a request to retrieve the missing code dependencies. For example, the application server 205 may retransmit a non-framework network request at 220 or transmit a framework network request at 240 to retrieve the missing one or more code dependencies. When the application server 205 receives the code dependencies (e.g., based on these requests or any previous requests), the application server 205 may serve the code dependencies to the loading process 215 in order to continue loading the application framework. The application server 205 may utilize this failsafe mechanism at any point in the application bootstrap chain. In some cases, the non-framework network request may be asynchronous, and bootstrap code using the network responses (e.g., any loading processes dependent on the code dependencies) may support handling for arbitrary delays when loading dependencies over the network.

The system architecture 200 may not modify any of the code to be loaded, or any code associated with the framework or application loading process 215 functionality (e.g., framework or application bootstrap code). For example, application code, application bootstrap code, framework code, framework bootstrap code, library code, code dependencies, or any combination of these may remain unchanged despite the preemptive loading process 210. The preemptive loading process 210 may in some cases include a pre-fetch function for code dependencies. One specific example code segment is provided below:

```
prefetch( {
    url1: 'https://example.com/resource1',
    url2: 'https://example.com/resource2'
} ).then( function( ) {
    /*...application execution... */
} );
``` where the application execution may depend upon url1 and url2. The framework code may access the pre-loaded code dependencies in the memory cache 235 using framework-standard techniques, reducing the non-trivial framework loading time. Accordingly, the system architecture 200 involved in improving the loading efficiency may be transparent to a user, while the reduced loading latency may be perceivable to the user. The system architecture 200 may improve performance without modifying the interaction between the application code and the application framework.

In one specific example of preemptive loading of code dependencies for improved performance, the application server 205 may load application code depending on three code dependencies. The application code may be an example of JavaScript code associated with handling communication messages (e.g., emails, calendar events, etc.), and may depend on library code for email access (e.g., Office.js), user input and network requests associated with login permissions or information, and a framework code (e.g., Angular 1.5.x framework code), which may be referred to as a framework module. In some cases, loading the framework code may depend on loading the library code and the user input and network requests. For example, loading Angular 1.5.x framework code may depend on first loading Office.js and authorizing access using the login permissions.

To improve the efficiency of the loading process 215 for the framework code and the application code, the application server 205 may utilize a preemptive loading process 210 for Office.js and the login permissions information. For example, in a first implementation, the application server 205 may begin a loading (i.e., boot-up) process for the Angular framework code. The application server 205 may supply partially resolved information for the Angular framework loading process 215, such that the application server 205 may perform one or more framework loading functions while simultaneously performing non-framework requests. For example, based on initiating the Angular framework loading process 215, the application server 205 may begin a preemptive loading process 210 in parallel for Office.js and the login information. The application server 205 may transmit network requests for these code dependencies while performing other functions of the loading process 215. In this specific example, the application server 205 may transmit two non-framework requests, performing a first fetch operation for the library code and a second fetch operation for the login permissions. The application server 205 may perform these fetching operations using methods or techniques not traditionally available within framework or application code (e.g., using native JavaScript browser capabilities). Once these code dependencies are loaded (e.g., the code for Office.js is imported and the login data is retrieved), the application server 205 may proxy these code dependencies into the corresponding dependent points within the application framework loading process 215 (e.g., directly over the network or via the local memory cache 235). The application server 205 may complete the loading process 215 based on these loaded code dependencies, and may execute the application code based on loading the corresponding Angular framework code.

In a second implementation, the application server 205 may identify code dependencies to load prior to initiation of the application framework loading process 215. For example, the application server 205 may include one or more indications of dependent code, dependent data, or dependent permissions to pre-fetch before the loading process 215 using non-framework techniques. In some cases, a user may specify these code dependencies to load. In other cases, the application server 205 may preemptively load certain code dependencies based on capabilities or settings of a specific user device, a tenant associated with a user of the user device, a set of programs or applications installed on the user device, analytics associated with the user device (e.g., frequently used libraries, permissions, applications, etc. for the user device), or any combination of these or other parameters indicating code dependencies for preemptive loading. In the example described above, the applications server 205 may automatically perform a preemptive loading process 210 for Office.js and the login credentials, and may store the loaded Office.js code and login credential information in the local memory cache 235. If the application server 205 performs a loading process 215 for code depending on either of these code dependencies (e.g., the Angular framework code), the application server 205 may access the already loaded code dependencies from the memory cache 235 to reduce the latency of the loading process 215.

In either the first implementation (e.g., the "on-the-fly" implementation) or the second implementation (e.g., the "preemptive" implementation) described above, the application server 205 may perform the remote network requests for Angular code dependencies prior to the Angular loading process 215 performing the remote network requests. Rather than perform the Angular remote network requests, the application server 205 may "intercept" the requests, and instead fetch the locally stored data from the memory cache 235. In this way, the applications server 205 may override the remote fetching operations of the loading process 215, and instead perform more efficient local fetching operations.

The application server 205 may perform similar implementations for application code execution. For example, the application server 205 may install or download code dependencies preemptively when booting-up a user device or on-demand at runtime. For example, if a user frequently runs a specific application on the user device, the application server 205 may begin network requests for any code dependencies associated with executing the application code when booting-up the user device. In this way, when the user accesses the application, the network requests may already be prepared or the code dependencies already retrieved and stored in a local memory cache 235. In some cases, the operating system (OS) for the user device may perform these preemptive remote network requests on user device start-up. In other cases, the user device may perform these preemptive remote network requests using networking capabilities not available to the OS, but may provide the retrieved code dependencies or data to applications using standard OS techniques.

For loading code dependencies on-demand at runtime, the application server 205 may identify any code dependencies not installed for an application. If the application server 205 executes the application code (e.g., based on a user input), the application server 205 may automatically download the code dependencies at runtime (e.g., using the non-framework requests). In this way, the user may refrain from explicitly installing libraries from an external system prior to executing application code, as the application server 205 may perform the library installation on-the-fly. In all of the above implementations, the application server 205 may reduce latency experienced by the user when attempting to load an application framework or execute application code.

An additional extension of the system architecture 200 may involve replacing one or more asynchronous functions within a coding library with mock implementations of the functions. When an application server 205 loads or performs more than one of these asynchronous functions, the application server 205 may initially use the mock implementations in the loading process. On the backend, the application server 205 may queue the multiple asynchronous functions, and may perform lazy or ad-hoc loads (e.g., using backend batch functionality) for the asynchronous functions. As these functions are loaded—or once all of the asynchronous functions are loaded—the application server 205 may resolve the asynchronous functionality in place of the initial mock implementations. In some cases, the application server 205 may load the entire coding library for such an extension.

This additional extension may include a promise object for the mock implementation. In one specific implementation, the promise object may be an example of a remotely loaded class, and may be defined as:

```
class PromiseObj {
    async fnAddOne(a) {
        return( new Promise( ) ).resolve( a + 1 )
    };
    async fnAddTwo(a) {
        return( new Promise( ) ).resolve( a + 2 )
    };
},
``` where this promise object may eventually be fulfilled based on the lazy loading process on the backend. For example, the application server 205 may utilize a specific potential technique involving instantiating a promise object and implementing asynchronous loads, as described below in a specific implementation:

```
var lazyPromiseObj = new Lazy(
    'http://example.com/PromiseObjBundle.js'
);
lazyPromiseObj
    .fnAddOne( 5 )
```

```
    .fnAddTwo( 10 )
    .then( ( result ) => log );
async yarn.lodash( 'v1.2.3' ).then( ( lodash ) => {
} );
asynch import.yarn.lodash( );
asynch import.yarn.leftpad( );
import lodash from LoDash;
```

In some cases, the application server 205 may perform dynamic bundle generation to determine which code to load simultaneously.

Figure 3:
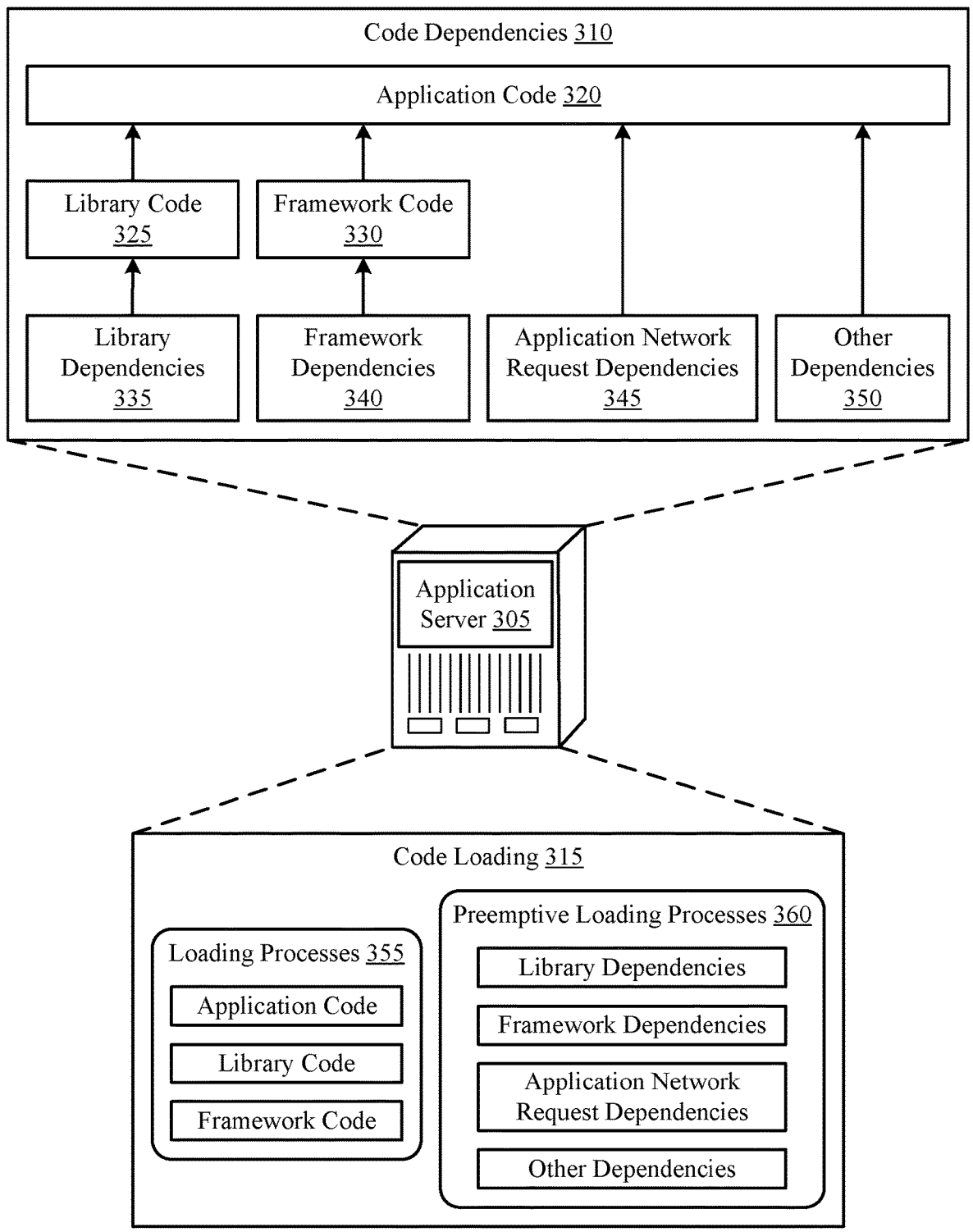
FIG. 3 illustrates an example of code dependencies and loading processes that support preemptive loading of code dependencies for improved performance in accordance with aspects of the present disclosure.

FIG. 3 illustrates an example of code dependencies and loading processes 300 that support preemptive loading of code dependencies for improved performance in accordance with aspects of the present disclosure. An application server 305, which may be an example of an application server 205 as described with reference to FIG. 2, may perform a number of code loading processes 315 based on code dependencies 310 for application code 320. For example, the application server 305 may perform a number of loading processes 355 in order to make the application code 320 available for execution. To improve the latency involved in making the application code 320 available, the application server 305 may additionally perform a number of preemptive loading processes 350 for any dependencies of the application code 320 (e.g., using a system architecture 200 as described above with reference to FIG. 2).

To execute application code 320, the application server 305 may first load all code dependencies 310 for the application code 320. In some cases, the application code 320 may utilize library code 325, framework code 330, application programming interfaces (APIs), or any combination thereof. In some cases, the library code 325, framework code 330, and/or APIs may collectively be referred to as a framework module. In other cases, the framework module may strictly refer to the framework code 330. The application code 320, library code 325, framework code 330, APIs, or any combination of these may depend on other coding dependencies. For example, the library code 325 may depend on library dependencies 335, the framework code 330 may depend on framework dependencies 340, the application code 320 may depend on application network request dependencies 345 or any other dependencies 350, or any combination of these codes may depend on any combination of the other codes or dependencies. For example, the framework dependencies 340 may include one or more library codes 325, and those library codes 325 may or may not include further code dependencies. In this way, loading the application code 320 may depend on one or more chains of dependent files, processes, or network activities.

The application server 320 may load the code and code dependencies using one or more loading processes 355 and preemptive loading processes 360 for code loading 315. For example, in some cases, the application server 305 may load the application code 320, library code 325, framework code 330, or any combination of these codes either simultaneously or in sequence (e.g., using one or more bundles). To improve the efficiency of the loading processes 355, the application server 305 may perform preemptive loading processes 360 for code dependencies, such as library dependencies 335, framework dependencies 340, application network request dependencies 345, or any combination of these or other dependencies 350. The application server 305 may perform the preemptive loading processes 360 prior to initiating the loading processes 355, or in parallel with the loading processes 355. In either case, the application server 305 may modify one or more hard dependencies within the loading processes 355 such that the application server 305 handles these hard dependencies as soft dependencies. For example, the application server 305 may virtualize one or more of the code dependencies, such that the loading process 305 may continue past loading the code dependencies (e.g., whether or not the code dependencies are actually loaded yet) and perform other loading functions not dependent on the code dependencies. In this way, the application server 305 may perform a set of pre-render tasks associated with the loading processes 355 that do not directly depend on loaded code dependencies. Once the preemptive loading processes 360 are complete, the application server 305 may perform a set of post-render tasks associated with the loading processes 355 that do depend on the preemptively loaded code dependencies. With virtualization, in some cases, the application server 305 may handle the code dependencies as soft dependencies for pre-render tasks and as hard dependencies for post-render tasks. In other cases, the application server 305 may handle code dependencies as soft dependencies when loading code and as hard dependencies when executing code (e.g., executing the application code 320).

In some cases, the application server 305 may perform one or more of the loading processes 355 or preemptive loading processes 360 on-the-fly at runtime. In these cases, the application server 305 may receive a request to execute the application code 320. The application server 305 may identify whether all of the code dependencies 310 for the application code 320 are loaded, and may determine whether to execute the application code 320 based on the identification. For example, the application server 305 may execute the application code 320 if all of the code dependencies 310 for the application code 320 are loaded, and may refrain from executing the application code 320 if not all of the code dependencies 310 are loaded. In some cases, the application server 305 may automatically execute the application code 320 once all of the code dependencies 310 are loaded, or the application server 305 may send an indication to a user interface of a user device that the application code 320 was not executed based on unresolved dependencies.

In one specific example, the application server 305 may simultaneously load framework dependencies 340 and application network request dependencies 345, and may bypass any number of dependencies using raw or direct access calls. The application server 305 may provide the results of these raw or direct access calls to library code 325, framework code 330, or both, in order to reduce the loading latency for these codes. The application server 320 may then execute the application code 320 based on loading the library code 325, framework code 330, or both. In this way, the application server 305 may bridge between the application code 320 and capabilities not traditionally accessible by application or user code (e.g., due to timing or dependency chain constraints), and may provide these capabilities prior to when the application may need them.

For example, the application server 305 may perform application bootstrapping (e.g., code loading 315) for a communication message application, such as an email management application. The application bootstrapping process may include loading a library code 325 (e.g., Office.js), evaluating one or more code bundles, performing a framework bootstrap process (e.g., for framework code 330, such as Angular framework code), initializing an application service, and rendering a user interface using the framework. In some cases, initializing the application service may further include performing initial network calls, including fetching a session identifier, fetching a cross-site request forgery (XSRF) token, fetching user information, determining data sources, determining organizations or tenants, determining license information, or performing any combination of these or other network requests associated with the application.

Rather than performing this application bootstrapping process in sequence, the application server 305 may remove the dependencies on the library code 325 from the bundling and application service initialization. Accordingly, the application server 305 may load the library code 325 using preemptive loading processes 360 while simultaneously performing the bundling and application service initialization using loading processes 355. For example, by removing the dependency on the library code 325, the application server 305 may perform a set of pre-render tasks including authenticating any combination of the session identifier, XSRF token, user information, data sources, organizations or tenants, and license information before completing the preemptive loading process 360 for the library code 325. In this way, the application server 305 may perform any functions for the loading process 355 that are independent of code dependencies before the code dependencies are loaded. When the pre-render tasks are complete, the application server 305 may pause the application service initialization before finishing the loading process 355, and may wait for resolution of a promise. The promise may be initialized at or near the beginning of the loading process 355 or preemptive loading process 360 (e.g., when index.html is downloaded), and may be resolved when the code dependencies are loaded or initialized (e.g., at window.Office.initialize). Once the promise is resolved (e.g., the library code 325 is loaded), the application server 305 may perform post-render tasks dependent on the code dependencies, such as the library code 325 (e.g., InboxRouter functionality dependent on Office.js). The application server 305 may complete the loading process 355 based on completing the post-render tasks. Additionally or alternatively, the application server 305 may remove any dependencies of network services on framework code 330. Any network calls may be separate from framework code or framework bootstrapping (e.g., by using non-framework techniques). In some cases, the application server 305 may additionally remove one or more code files (e.g., Sugar.js) from the code bundles to load in order to improve the efficiency of the system.

In some cases, the reduction in loading latency may be perceivable by a user interacting with the application server 305. To further illustrate the reductions in latency, the application server 305 may implement a user timing API that includes application-specific timestamps in a performance timeline of a browser. These application-specific timestamps may indicate the start and end of loading or execution processes. Based on these indications, a user may determine the savings in wall-clock time associated with making application code available for execution. In some cases, using preemptive loading processes may make application code available to a user one or more seconds (e.g., about three seconds) faster than using sequential framework loading.

Figure 4:
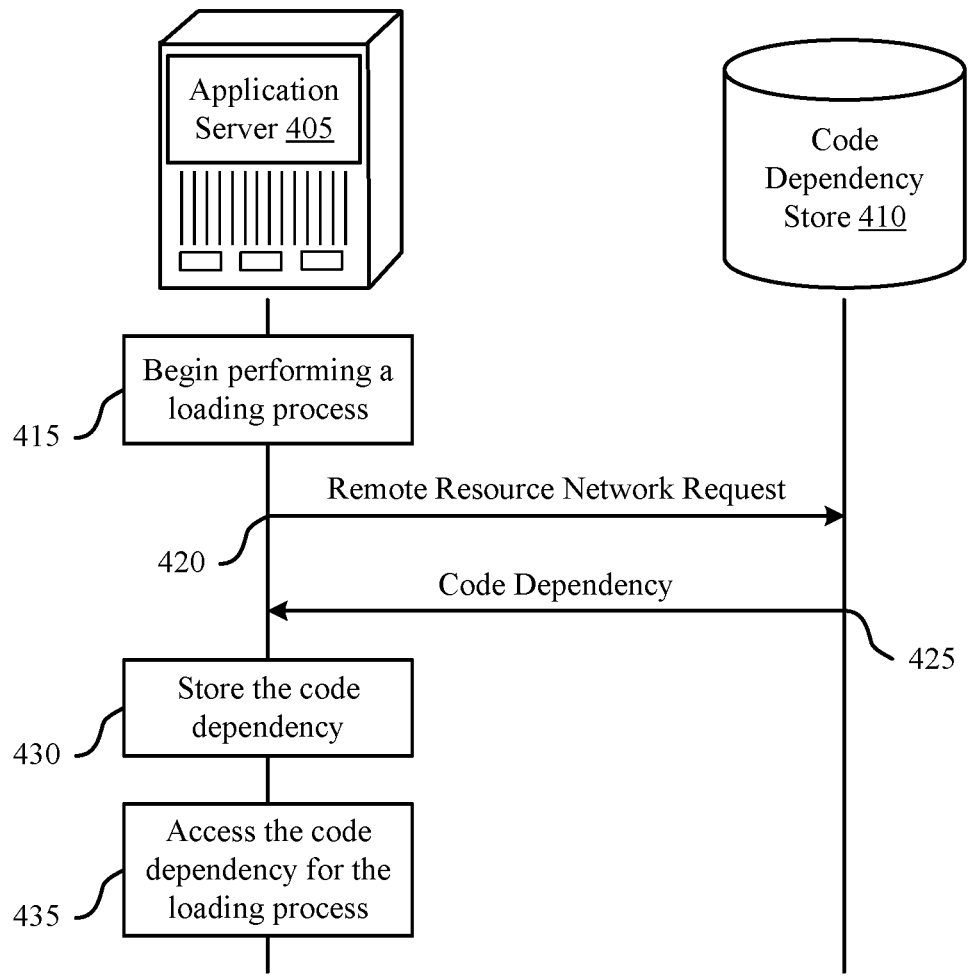
FIGS. 4 and 5 illustrate examples of process flows that support preemptive loading of code dependencies for improved performance in accordance with aspects of the present disclosure.

FIG. 4 illustrates an example of a process flow 400 that supports preemptive loading of code dependencies for improved performance in accordance with aspects of the present disclosure. The process flow 400 may include an application server 405 and a code dependency store 410, which may be examples of the corresponding devices described above with reference to FIGS. 2 and 3. The process flow 400 may illustrate an efficient loading process for code at the application server 405.

At 415, the application server 405 may begin performing a loading process for a framework module, where the loading process includes a framework request to retrieve a code dependency. The framework module may include framework code, library code, APIs, or any combination of these or other code supporting an application. Rather than wait to retrieve the code dependency using the framework request, the application server 405 may implement a non-framework request to preemptively load the code dependency. For example, at 420, the application server 405 may transmit a remote resource network request (e.g., a fetching method using a fetch API, a data retrieval request using an object for server interaction, etc.) to the code dependency store 410. In some cases, the application server 405 may transmit the remote resource network request prior to beginning the loading process. In other cases, the application server 405 may transmit the remote resource network request in parallel to performing framework loading processes for the framework module.

At 425, the application server 405 may receive, from the code dependency store 410, the requested code dependency in response to the remote resource network request. At 430, the application server 405 may store the code dependency in a local memory cache of the application server 405 for use in the loading process. The application server 405 may access the code dependency in the local memory store for use in the loading process at 435. For example, the application server 405 may intercept the framework request for the loading process, and may provide the code dependency from the local memory cache as opposed to retrieving the code dependency remotely over the network. By accessing the code dependency locally, as opposed to remotely, the application server 405 may improve the efficiency and performance of the loading process for the framework module.

Figure 5:
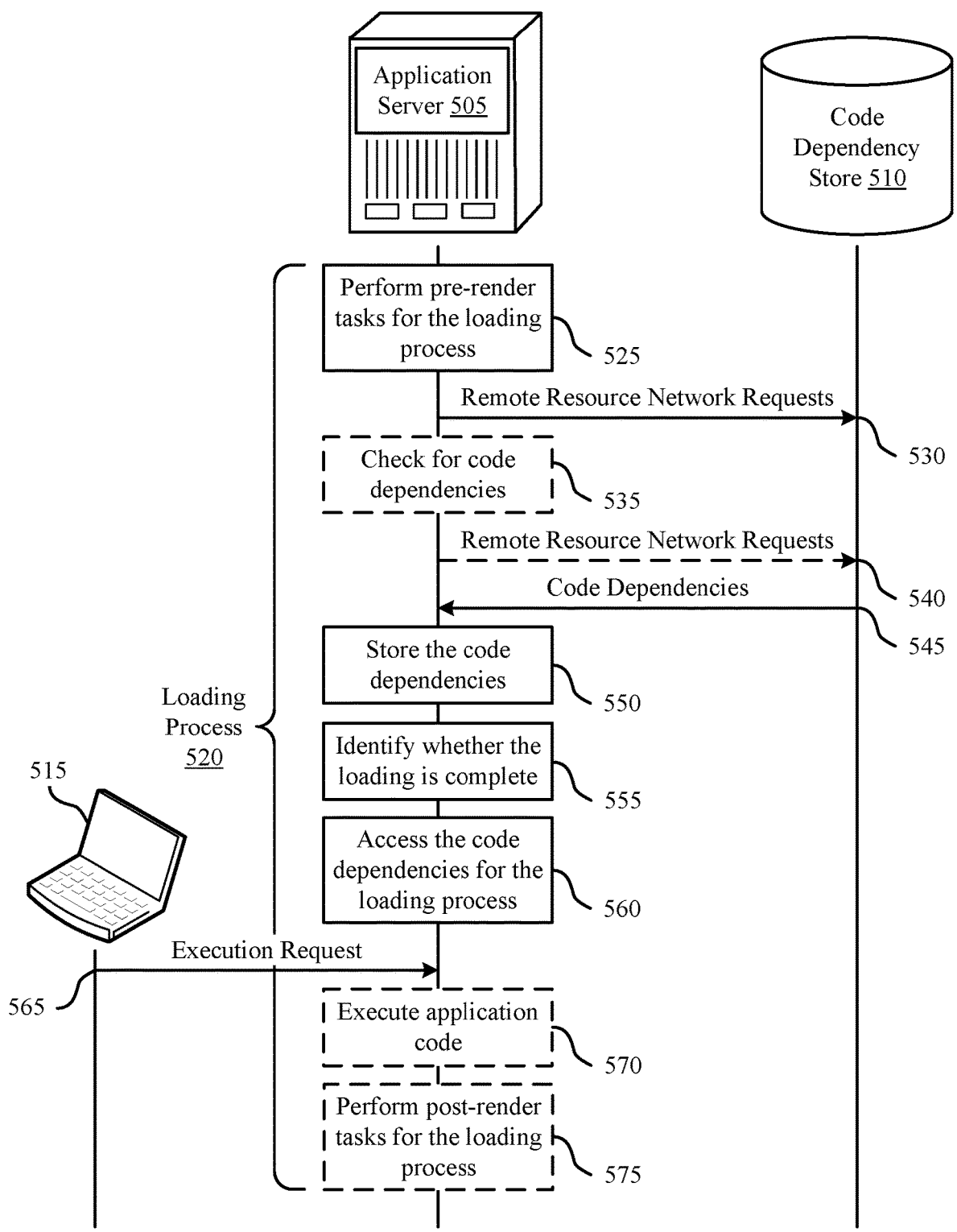

FIG. 5 illustrates an example of a process flow 500 that supports preemptive loading of code dependencies for improved performance in accordance with aspects of the present disclosure. The process flow 500 may include an application server 505 and a code dependency store 510, which may be examples of the corresponding devices described above with reference to FIGS. 2 through 4. The process flow 500 may additionally include a user device 515. In some cases, the application server 505 may be an example of a software component of the user device 515. The process flow 500 may illustrate an execution process for application code involving an efficient preemptive loading technique.

The application server 505 may perform a loading process 520 for an application framework, which may be referred to as a framework module. The application server 505 may initiate the loading process 520 in order to make an application code available for execution to a user of the user device 515. At 525, the application server 505 may perform one or more pre-render tasks for the loading process. These pre-render tasks may be independent of code dependencies. In some cases, the application server 505 may utilize virtualization and soft dependencies in order to perform the set of pre-render tasks.

At 530, the application server 505 may transmit remote resource network requests to retrieve the code dependencies for the framework module, the application code, or both. In some cases, the application server 505 may transmit the remote resource network requests (e.g., non-framework requests) prior to the loading process 520. In other cases, the application server 505 may transmit the remote resource network requests in parallel with other loading functionality. For example, the application server 505 may begin the network requests while performing framework processes, such as the pre-render tasks at 525.

In some cases, at 535, the application server 505 may check for the code dependencies in a local memory cache. For example, the application server 505 may intercept a framework request for the code dependencies, and may search locally for the code dependencies in the memory of the application server 505. If the application server 505 has not received the code dependencies in response to the remote resource network requests, the application server 505 may pause the loading process 520, retransmit the remote resource network requests (e.g., using non-framework or framework techniques) at 540, or both. In some cases, the application server 505 may identify one or more code dependencies stored locally, and one or more code dependencies not stored locally, and may transmit or retransmit remote resource network requests for the one or more code dependencies not stored locally. This may be due to not receiving these code dependencies in response to the pre-emptive remote resource network requests at 530, or due to not transmitting preemptive remote resource network requests for these code dependencies.

At 545, the application server 505 may receive the code dependencies in response to the remote resource network requests. These code dependencies may be retrieved from a code dependency store 510, which may be an example of a database, a server, a user device, or any other similar device. At 550, the application server 505 may store the code dependencies in a local memory cache.

At 555, the application server 505 may identify whether the loading process 520 is complete. For example, the application server 505 may determine whether loading the code dependencies is complete. The application server 505 may additionally or alternatively determine whether the loading process for the application code or the framework module corresponding to the application code is complete.

At 560, the application server 505 may access the code dependencies for the loading process 520 from the local memory cache. If the application server 505 previously paused the loading process 520, the application server 505 may resume the loading process 520 based on retrieving the code dependencies from the local memory cache.

At 565, the application server 505 may receive an execution request for the application, for example, from a user device 515. This execution request may be based on a user input at the user device. If the application code and all corresponding code dependencies are loaded, the application server 505 may execute the application code at 570 in response to the execution request.

At 575, the application server 505 may complete the loading process by performing a set of post-render tasks for the loading process, where the post-render tasks depend upon the accessed code dependencies. In some cases, the application server 505 may perform the post-render tasks based on executing the application code.

Figure 6:
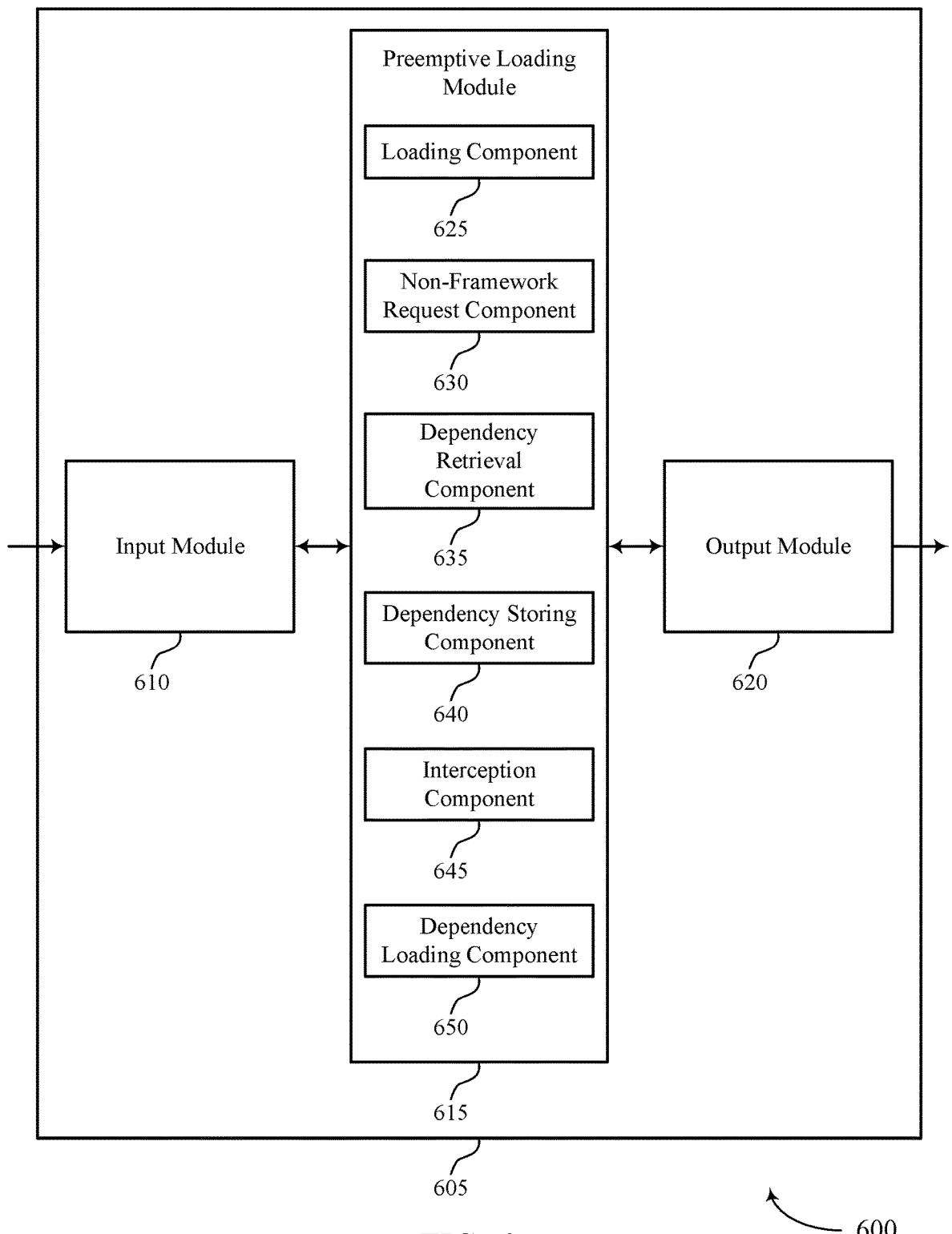
FIGS. 6 and 7 show block diagrams of a device that supports preemptive loading of code dependencies for improved performance in accordance with aspects of the present disclosure.

FIG. 6 shows a block diagram 600 of an apparatus 605 that supports preemptive loading of code dependencies for improved performance in accordance with aspects of the present disclosure. Apparatus 605 may include input module 610, preemptive loading module 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

Preemptive loading module 615 may be an example of aspects of the preemptive loading module 715 or 815 described with reference to FIGS. 7 and 8. Preemptive loading module 615 and/or at least some of its various sub-components may be implemented in hardware, software executed by a processor, firmware, or any combination thereof. If implemented in software executed by a processor, the functions of the preemptive loading module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The preemptive loading module 615 and/or at least some of its various sub-components may be physically located at various positions, including being distributed such that portions of functions are implemented at different physical locations by one or more physical devices. In some examples, preemptive loading module 615 and/or at least some of its various sub-components may be a separate and distinct component in accordance with various aspects of the present disclosure. In other examples, preemptive loading module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Preemptive loading module 615 may also include loading component 625, non-framework request component 630, dependency retrieval component 635, dependency storing component 640, interception component 645, and dependency loading component 650.

Loading component 625 may perform a loading process for a framework module, where the loading process includes a framework request to retrieve a code dependency. Non-framework request component 630 may transmit a remote resource network request to retrieve the code dependency prior to transmitting the framework request. Dependency retrieval component 635 may receive the code dependency in response to the remote resource network request. Dependency storing component 640 may store the code dependency in a local memory cache of the application server. Interception component 645 may intercept the framework request for the loading process. Dependency loading component 650 may access the code dependency for the loading process from the local memory cache based on intercepting the framework request.

Figure 7:
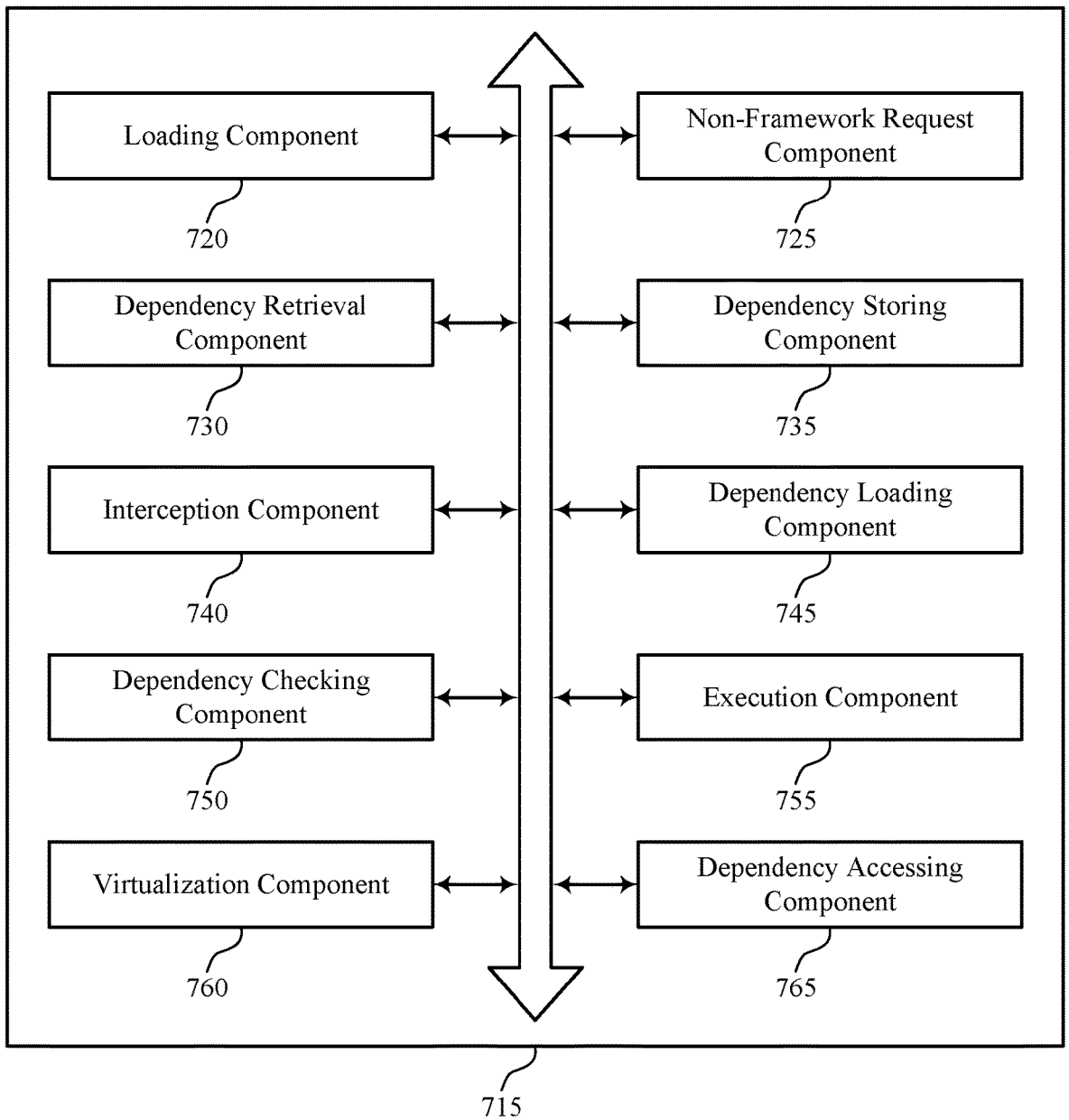

FIG. 7 shows a block diagram 700 of a preemptive loading module 715 that supports preemptive loading of code dependencies for improved performance in accordance with aspects of the present disclosure. The preemptive loading module 715 may be an example of aspects of a preemptive loading module 615 or 815 described with reference to FIGS. 6 and 8. The preemptive loading module 715 may include loading component 720, non-framework request component 725, dependency retrieval component 730, dependency storing component 735, interception component 740, dependency loading component 745, dependency checking component 750, execution component 755, virtualization component 760, and dependency accessing component 765. Each of these modules may communicate, directly or indirectly, with one another (e.g., via one or more buses).

Loading component 720 may perform a loading process for a framework module, where the loading process includes a framework request to retrieve a code dependency. In some cases, performing the loading process for the framework module includes performing a set of pre-render tasks independent of the code dependency. Loading component 720 may complete the loading process for the framework module based on accessing the code dependency. In some cases, completing the loading process for the framework module includes performing a set of post-render tasks dependent on the code dependency. Additionally or alternatively, loading component 720 may load application code, where the application code depends on the framework module. In some cases, loading the application code begins prior to completing the loading process for the framework module.

Non-framework request component 725 may transmit a remote resource network request to retrieve the code dependency prior to transmitting the framework request. In some cases, the remote resource network request is transmitted after beginning the loading process for the framework module. In other cases, the remote resource network request is transmitted prior to beginning the loading process for the framework module. In some cases, the remote resource network request includes a fetching method using a fetch API, a data retrieval request using an object for server interaction, or a combination thereof.

Dependency retrieval component 730 may receive the code dependency in response to the remote resource network request. Dependency storing component 735 may store the code dependency in a local memory cache of the application server.

Interception component 740 may intercept the framework request for the loading process. Dependency loading component 745 may access the code dependency for the loading process from the local memory cache based on intercepting the framework request.

Dependency checking component 750 may determine that the code dependency is not yet stored in the local memory cache of the application server, and in some cases may pause the loading process prior to performing the set of post-render tasks based on the determining, and may resume the loading process based on storing the code dependency in the local memory cache of the application server. In other cases, dependency checking component 750 may retransmit the remote resource network request to retrieve the code dependency.

Execution component 755 may receive an execution request for the application code, identify whether the loading process for the framework module is complete, and determine whether to execute the application code based on the identifying.

Virtualization component 760 may virtualize the code dependency during the loading process for the framework module. Dependency accessing component 765 may access the code dependency during execution of the framework module.

Figure 8:
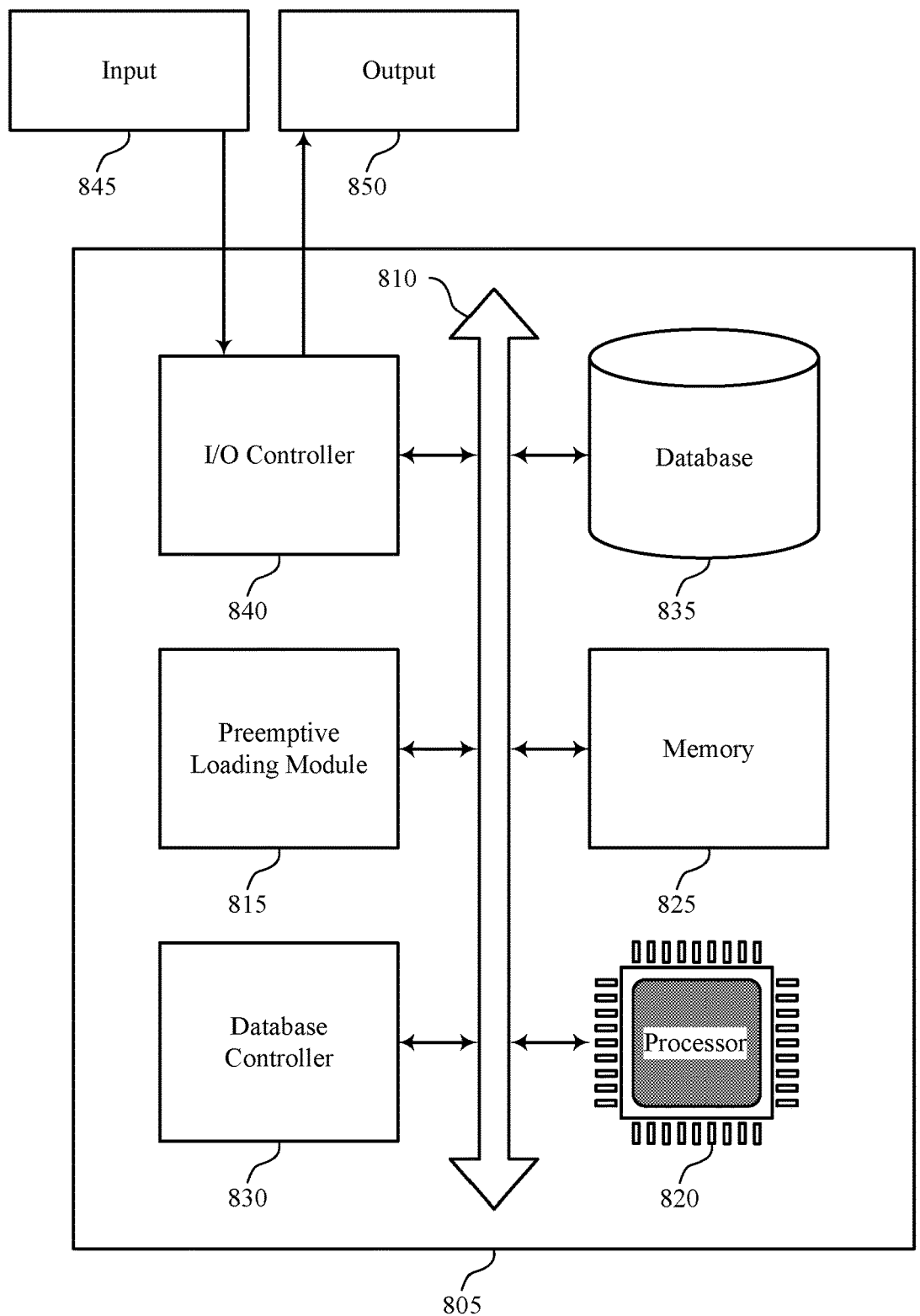
FIG. 8 illustrates a block diagram of a system including a application server that supports preemptive loading of code dependencies for improved performance in accordance with aspects of the present disclosure.

FIG. 8 shows a diagram of a system 800 including a device 805 that supports preemptive loading of code dependencies for improved performance in accordance with aspects of the present disclosure. Device 805 may be an example of or include the components of an application server or a user device as described above, e.g., with reference to FIGS. 1 through 5. Device 805 may include components for bi-directional data communications including components for transmitting and receiving communications, including preemptive loading module 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting preemptive loading of code dependencies for improved performance).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
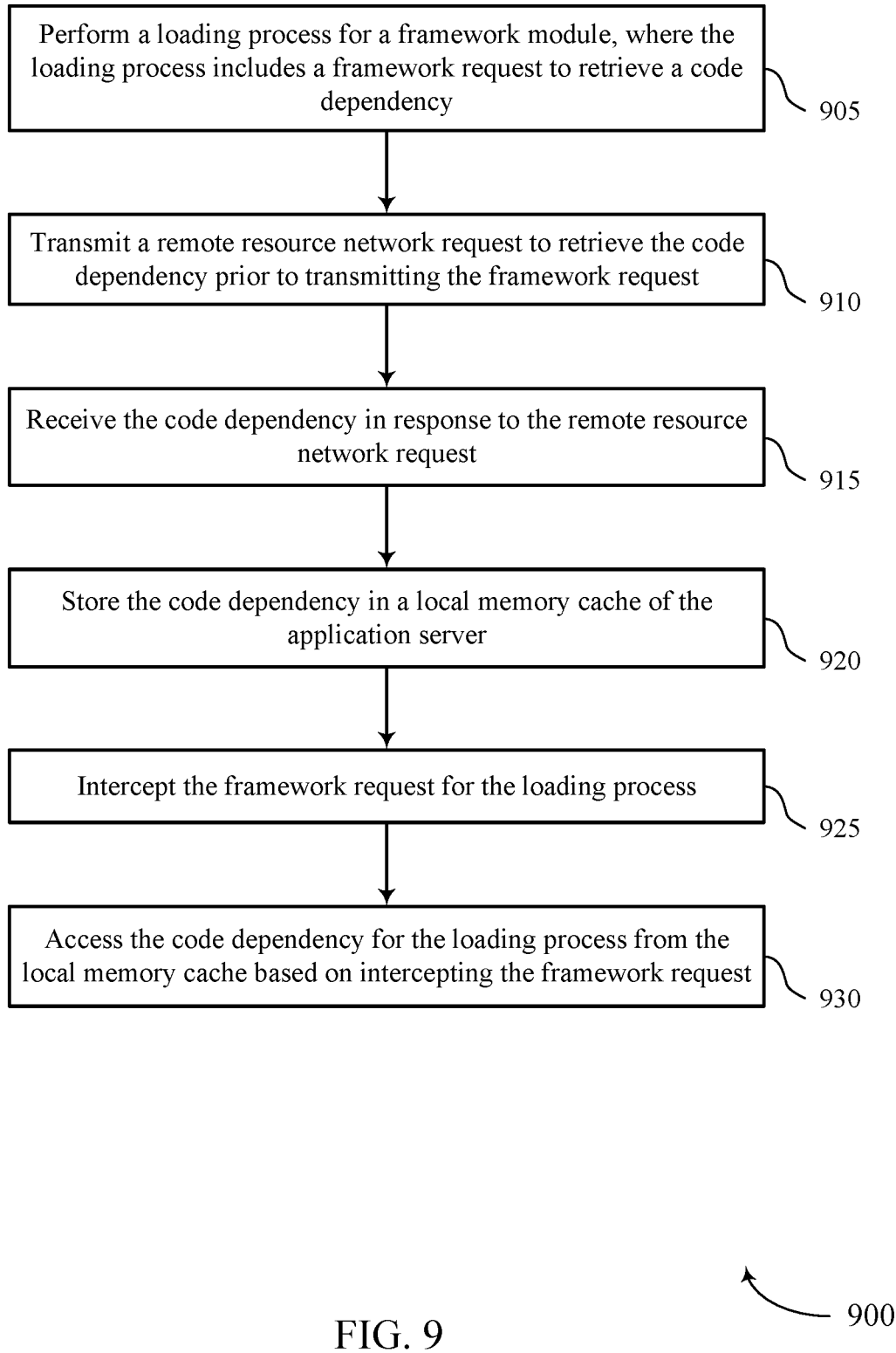
FIGS. 9 through 12 illustrate methods for preemptive loading of code dependencies for improved performance in accordance with aspects of the present disclosure.

FIG. 9 shows a flowchart illustrating a method 900 for preemptive loading of code dependencies for improved performance in accordance with aspects of the present disclosure. The operations of method 900 may be implemented by an application server or its components as described herein, for example, with reference to FIGS. 2 through 5. For example, the operations of method 900 may be performed by a preemptive loading module as described with reference to FIGS. 6 through 8. In some examples, an application server may execute a set of codes to control the functional elements of the device to perform the functions described below. Additionally or alternatively, the application server may perform aspects of the functions described below using special-purpose hardware.

At 905 the application server may perform a loading process for a framework module, wherein the loading process comprises a framework request to retrieve a code dependency. The operations of 905 may be performed according to the methods described herein. In certain examples, aspects of the operations of 905 may be performed by a loading component as described with reference to FIGS. 6 through 8.

At 910 the application server may transmit a remote resource network request to retrieve the code dependency prior to transmitting the framework request. The operations of 910 may be performed according to the methods described herein. In certain examples, aspects of the operations of 910 may be performed by a non-framework request component as described with reference to FIGS. 6 through 8.

At 915 the application server may receive the code dependency in response to the remote resource network request. The operations of 915 may be performed according to the methods described herein. In certain examples, aspects of the operations of 915 may be performed by a dependency retrieval component as described with reference to FIGS. 6 through 8.

At 920 the application server may store the code dependency in a local memory cache of the application server. The operations of 920 may be performed according to the methods described herein. In certain examples, aspects of the operations of 920 may be performed by a dependency storing component as described with reference to FIGS. 6 through 8.

At 925 the application server may intercept the framework request for the loading process. The operations of 925 may be performed according to the methods described herein. In certain examples, aspects of the operations of 925 may be performed by an interception component as described with reference to FIGS. 6 through 8.

At 930 the application server may access the code dependency for the loading process from the local memory cache based at least in part on intercepting the framework request. The operations of 930 may be performed according to the methods described herein. In certain examples, aspects of the operations of 930 may be performed by a dependency loading component as described with reference to FIGS. 6 through 8.

Figure 10:
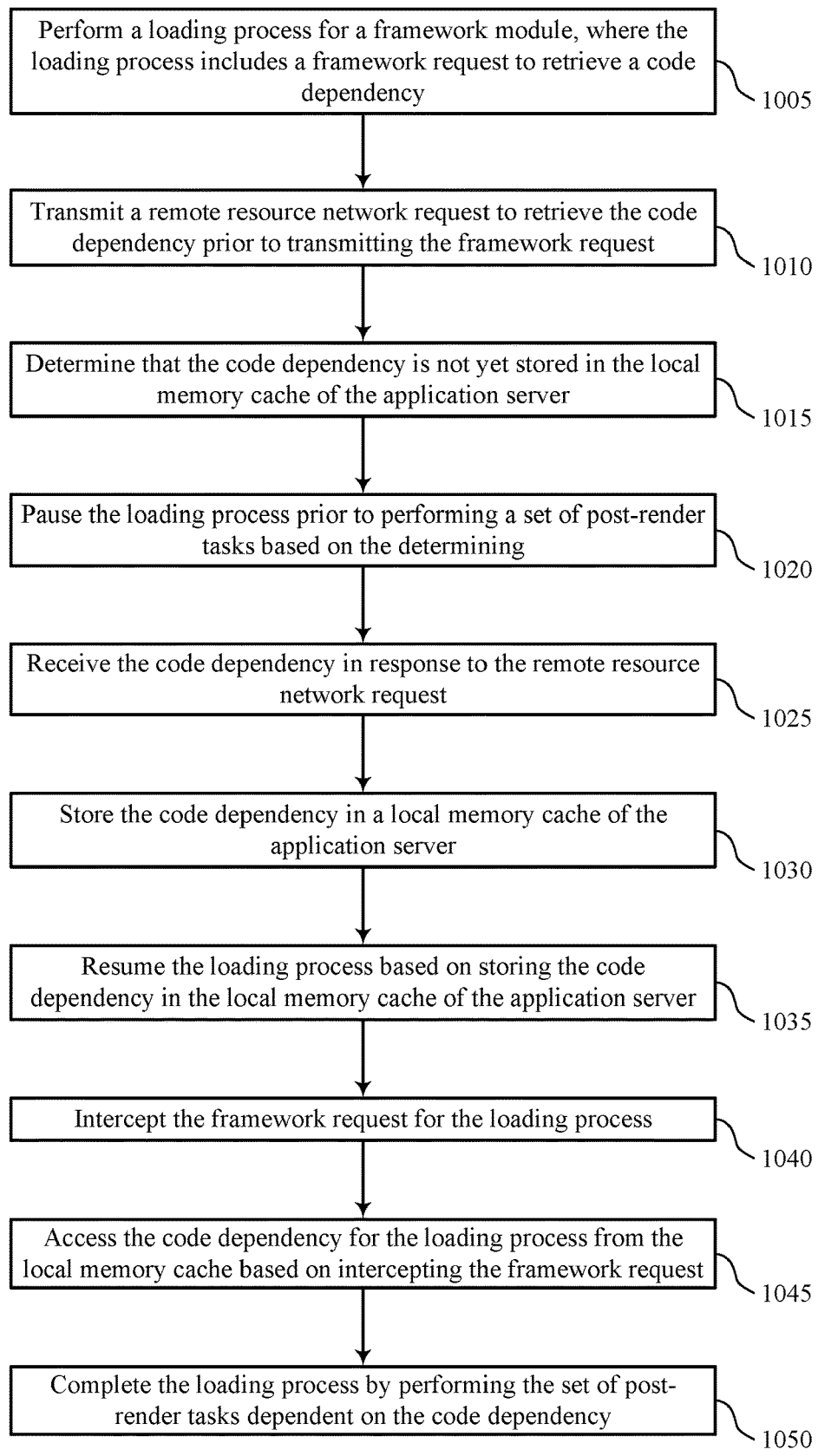

FIG. 10 shows a flowchart illustrating a method 1000 for preemptive loading of code dependencies for improved performance in accordance with aspects of the present disclosure. The operations of method 1000 may be implemented by an application server or its components as described herein, for example, with reference to FIGS. 2 through 5. For example, the operations of method 1000 may be performed by a preemptive loading module as described with reference to FIGS. 6 through 8. In some examples, an application server may execute a set of codes to control the functional elements of the device to perform the functions described below. Additionally or alternatively, the application server may perform aspects of the functions described below using special-purpose hardware.

At 1005 the application server may perform a loading process for a framework module, wherein the loading process comprises a framework request to retrieve a code dependency. The operations of 1005 may be performed according to the methods described herein. In certain examples, aspects of the operations of 1005 may be performed by a loading component as described with reference to FIGS. 6 through 8.

At 1010 the application server may transmit a remote resource network request to retrieve the code dependency prior to transmitting the framework request. The operations of 1010 may be performed according to the methods described herein. In certain examples, aspects of the operations of 1010 may be performed by a non-framework request component as described with reference to FIGS. 6 through 8.

At 1015 the application server may determine that the code dependency is not yet stored in the local memory cache of the application server. The operations of 1015 may be performed according to the methods described herein. In certain examples, aspects of the operations of 1015 may be performed by a dependency checking component as described with reference to FIGS. 6 through 8.

At 1020 the application server may pause the loading process prior to performing a set of post-render tasks based at least in part on the determining. The operations of 1020 may be performed according to the methods described herein. In certain examples, aspects of the operations of 1020 may be performed by a dependency checking component as described with reference to FIGS. 6 through 8.

At 1025 the application server may receive the code dependency in response to the remote resource network request. The operations of 1025 may be performed according to the methods described herein. In certain examples, aspects of the operations of 1025 may be performed by a dependency retrieval component as described with reference to FIGS. 6 through 8.

At 1030 the application server may store the code dependency in a local memory cache of the application server. The operations of 1030 may be performed according to the methods described herein. In certain examples, aspects of the operations of 1030 may be performed by a dependency storing component as described with reference to FIGS. 6 through 8.

At 1035 the application server may resume the loading process based at least in part on storing the code dependency in the local memory cache of the application server. The operations of 1035 may be performed according to the methods described herein. In certain examples, aspects of the operations of 1035 may be performed by a dependency checking component as described with reference to FIGS. 6 through 8.

At 1040 the application server may intercept the framework request for the loading process. The operations of 1040 may be performed according to the methods described herein. In certain examples, aspects of the operations of 1040 may be performed by an interception component as described with reference to FIGS. 6 through 8.

At 1045 the application server may access the code dependency for the loading process from the local memory cache based at least in part on intercepting the framework request. The operations of 1045 may be performed according to the methods described herein. In certain examples, aspects of the operations of 1045 may be performed by a dependency loading component as described with reference to FIGS. 6 through 8.

At 1050 the application server may complete the loading process for the framework module based at least in part on accessing the code dependency. Completing the loading process may involve performing the set of post-render tasks dependent on the code dependency. The operations of 1050 may be performed according to the methods described herein. In certain examples, aspects of the operations of 1050 may be performed by a loading component as described with reference to FIGS. 6 through 8.

Figure 11:
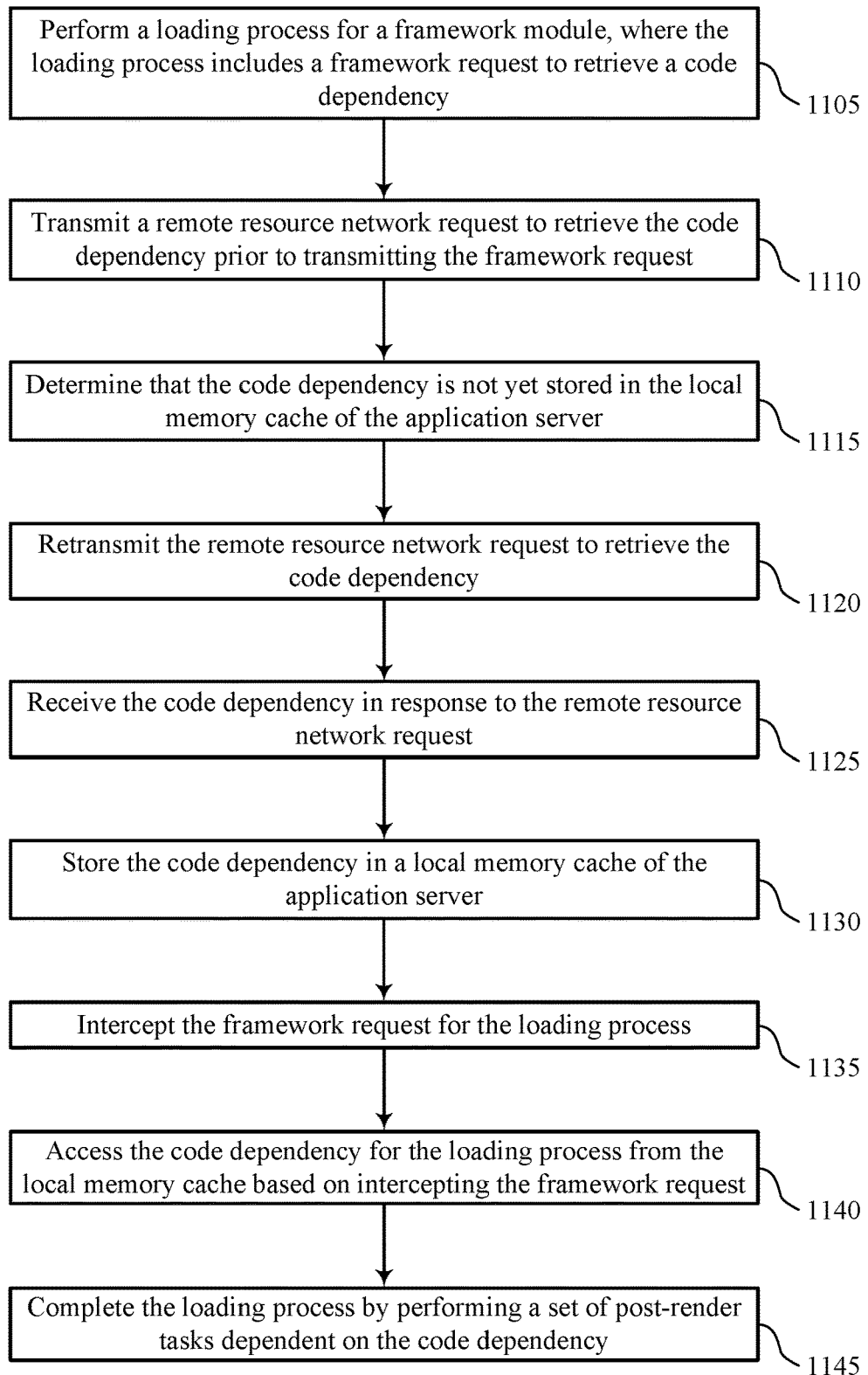

FIG. 11 shows a flowchart illustrating a method 1100 for preemptive loading of code dependencies for improved performance in accordance with aspects of the present disclosure. The operations of method 1100 may be implemented by an application server or its components as described herein, for example, with reference to FIGS. 2 through 5. For example, the operations of method 1100 may be performed by a preemptive loading module as described with reference to FIGS. 6 through 8. In some examples, an application server may execute a set of codes to control the functional elements of the device to perform the functions described below. Additionally or alternatively, the application server may perform aspects of the functions described below using special-purpose hardware.

At 1105 the application server may perform a loading process for a framework module, wherein the loading process comprises a framework request to retrieve a code dependency. The operations of 1105 may be performed according to the methods described herein. In certain examples, aspects of the operations of 1105 may be performed by a loading component as described with reference to FIGS. 6 through 8.

At 1110 the application server may transmit a remote resource network request to retrieve the code dependency prior to transmitting the framework request. The operations of 1110 may be performed according to the methods described herein. In certain examples, aspects of the operations of 1110 may be performed by a non-framework request component as described with reference to FIGS. 6 through 8.

At 1115 the application server may determine that the code dependency is not yet stored in the local memory cache of the application server. The operations of 1115 may be performed according to the methods described herein. In certain examples, aspects of the operations of 1115 may be performed by a dependency checking component as described with reference to FIGS. 6 through 8.

At 1120 the application server may retransmit the remote resource network request to retrieve the code dependency. The operations of 1120 may be performed according to the methods described herein. In certain examples, aspects of the operations of 1120 may be performed by a dependency checking component as described with reference to FIGS. 6 through 8.

At 1125 the application server may receive the code dependency in response to the remote resource network request (e.g., sent as the transmission, the retransmission, or both). The operations of 1125 may be performed according to the methods described herein. In certain examples, aspects of the operations of 1125 may be performed by a dependency retrieval component as described with reference to FIGS. 6 through 8.

At 1130 the application server may store the code dependency in a local memory cache of the application server. The operations of 1130 may be performed according to the methods described herein. In certain examples, aspects of the operations of 1130 may be performed by a dependency storing component as described with reference to FIGS. 6 through 8.

At 1135 the application server may intercept the framework request for the loading process. The operations of 1135 may be performed according to the methods described herein. In certain examples, aspects of the operations of 1135 may be performed by an interception component as described with reference to FIGS. 6 through 8.

At 1140 the application server may access the code dependency for the loading process from the local memory cache based at least in part on intercepting the framework request. The operations of 1140 may be performed according to the methods described herein. In certain examples, aspects of the operations of 1140 may be performed by a dependency loading component as described with reference to FIGS. 6 through 8.

At 1145 the application server may complete the loading process for the framework module based at least in part on accessing the code dependency. In some cases, completing the loading process for the framework module comprises performing a set of post-render tasks dependent on the code dependency. The operations of 1145 may be performed according to the methods described herein. In certain examples, aspects of the operations of 1145 may be performed by a loading component as described with reference to FIGS. 6 through 8.

Figure 12:
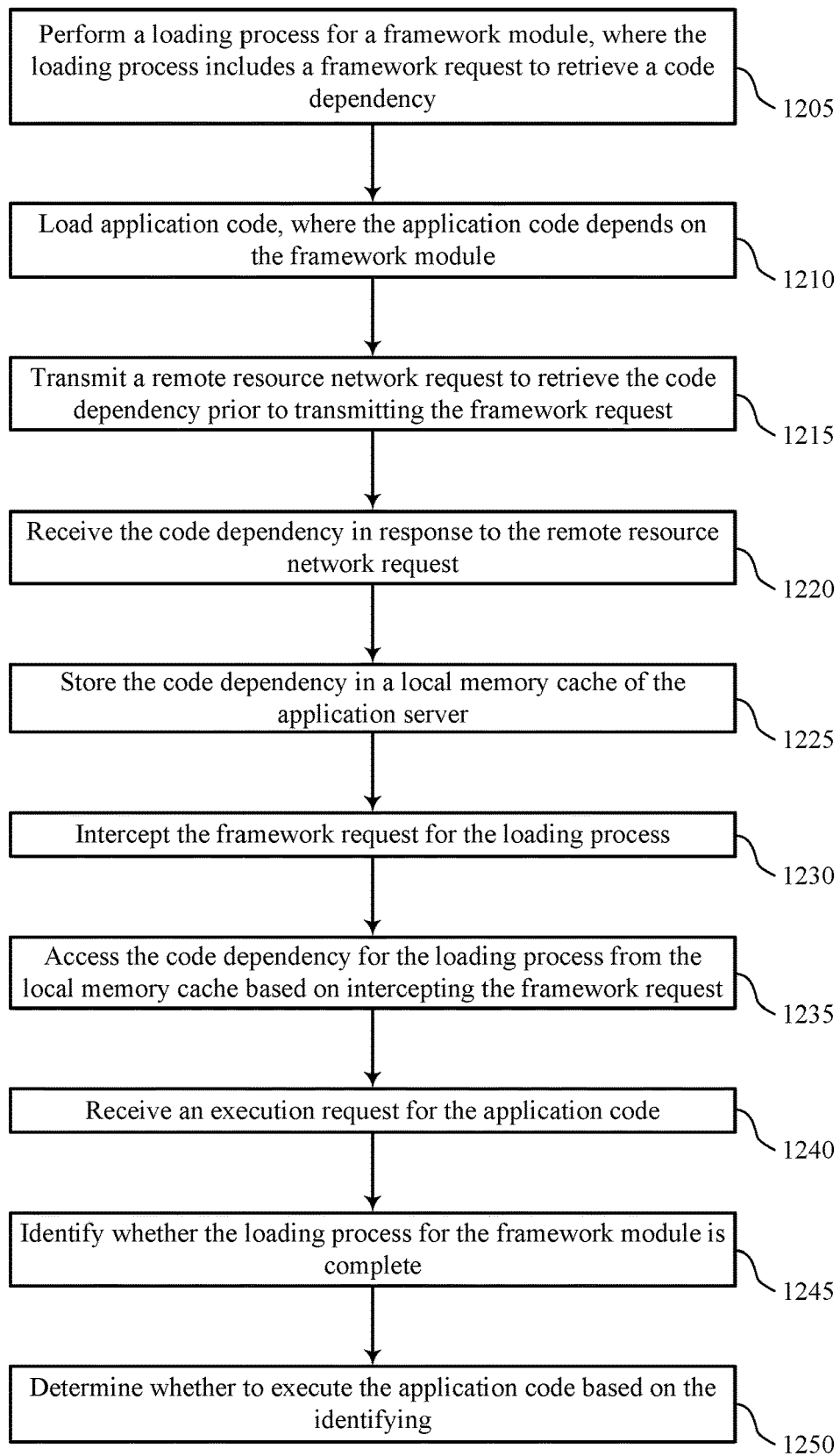

FIG. 12 shows a flowchart illustrating a method 1200 for preemptive loading of code dependencies for improved performance in accordance with aspects of the present disclosure. The operations of method 1200 may be implemented by an application server or its components as described herein, for example, with reference to FIGS. 2 through 5. For example, the operations of method 1200 may be performed by a preemptive loading module as described with reference to FIGS. 6 through 8. In some examples, an application server may execute a set of codes to control the functional elements of the device to perform the functions described below. Additionally or alternatively, the application server may perform aspects of the functions described below using special-purpose hardware.

At 1205 the application server may perform a loading process for a framework module, wherein the loading process comprises a framework request to retrieve a code dependency. The operations of 1205 may be performed according to the methods described herein. In certain examples, aspects of the operations of 1205 may be performed by a loading component as described with reference to FIGS. 6 through 8.

At 1210 the application server may load application code, wherein the application code depends on the framework module. In some cases, loading the application code may occur prior to or simultaneous to loading the framework module. The operations of 1210 may be performed according to the methods described herein. In certain examples, aspects of the operations of 1210 may be performed by a loading component as described with reference to FIGS. 6 through 8.

At 1215 the application server may transmit a remote resource network request to retrieve the code dependency prior to transmitting the framework request. The operations of 1215 may be performed according to the methods described herein. In certain examples, aspects of the operations of 1215 may be performed by a non-framework request component as described with reference to FIGS. 6 through 8.

At 1220 the application server may receive the code dependency in response to the remote resource network request. The operations of 1220 may be performed according to the methods described herein. In certain examples, aspects of the operations of 1220 may be performed by a dependency retrieval component as described with reference to FIGS. 6 through 8.

At 1225 the application server may store the code dependency in a local memory cache of the application server. The operations of 1225 may be performed according to the methods described herein. In certain examples, aspects of the operations of 1225 may be performed by a dependency storing component as described with reference to FIGS. 6 through 8.

At 1230 the application server may intercept the framework request for the loading process. The operations of 1230 may be performed according to the methods described herein. In certain examples, aspects of the operations of 1230 may be performed by an interception component as described with reference to FIGS. 6 through 8.

At 1235 the application server may access the code dependency for the loading process from the local memory cache based at least in part on intercepting the framework request. The operations of 1235 may be performed according to the methods described herein. In certain examples, aspects of the operations of 1235 may be performed by a dependency loading component as described with reference to FIGS. 6 through 8.

At 1240 the application server may receive an execution request for the application code. The operations of 1240 may be performed according to the methods described herein. In certain examples, aspects of the operations of 1240 may be performed by an execution component as described with reference to FIGS. 6 through 8.

At 1245 the application server may identify whether the loading process for the framework module is complete. The operations of 1245 may be performed according to the methods described herein. In certain examples, aspects of the operations of 1245 may be performed by an execution component as described with reference to FIGS. 6 through 8.

At 1250 the application server may determine whether to execute the application code based at least in part on the identifying. The operations of 1250 may be performed according to the methods described herein. In certain examples, aspects of the operations of 1250 may be performed by an execution component as described with reference to FIGS. 6 through 8.

A method of preemptively loading code dependencies at an application server is described. The method may include performing a loading process for a framework module, wherein the loading process comprises a framework request to retrieve a code dependency, transmitting a remote resource network request to retrieve the code dependency prior to transmitting the framework request, receiving the code dependency in response to the remote resource network request, and storing the code dependency in a local memory cache of the application server. The method may further include intercepting the framework request for the loading process, and accessing the code dependency for the loading process from the local memory cache based at least in part on intercepting the framework request.

An apparatus for preemptively loading code dependencies at an application server is described. The apparatus may include a processor, memory in electronic communication with the processor, and instructions stored in the memory. The instructions may be operable to cause the processor to perform a loading process for a framework module, wherein the loading process comprises a framework request to retrieve a code dependency, transmit a remote resource network request to retrieve the code dependency prior to transmitting the framework request, receive the code dependency in response to the remote resource network request, and store the code dependency in a local memory cache of the application server. The instructions may be further operable to cause the processor to intercept the framework request for the loading process, and access the code dependency for the loading process from the local memory cache based at least in part on intercepting the framework request.

A non-transitory computer-readable medium for preemptively loading code dependencies at an application server is described. The non-transitory computer-readable medium may include instructions operable to cause a processor to perform a loading process for a framework module, wherein the loading process comprises a framework request to retrieve a code dependency, transmit a remote resource network request to retrieve the code dependency prior to transmitting the framework request, receive the code dependency in response to the remote resource network request, and store the code dependency in a local memory cache of the application server. The instructions may be further operable to cause the processor to intercept the framework request for the loading process, and access the code dependency for the loading process from the local memory cache based at least in part on intercepting the framework request.

Some examples of the method, apparatus, and non-transitory computer-readable medium described above may further include processes, features, means, or instructions for completing the loading process for the framework module based at least in part on accessing the code dependency. In some examples of the method, apparatus, and non-transitory computer-readable medium described above, completing the loading process for the framework module comprises performing a set of post-render tasks dependent on the code dependency.

Some examples of the method, apparatus, and non-transitory computer-readable medium described above may further include processes, features, means, or instructions for determining that the code dependency is not yet stored in the local memory cache of the application server. Some examples of the method, apparatus, and non-transitory computer-readable medium described above may further include processes, features, means, or instructions for pausing the loading process prior to performing the set of post-render tasks based at least in part on the determining. Some examples of the method, apparatus, and non-transitory computer-readable medium described above may further include processes, features, means, or instructions for resuming the loading process based at least in part on storing the code dependency in the local memory cache of the application server.

Some examples of the method, apparatus, and non-transitory computer-readable medium described above may further include processes, features, means, or instructions for determining that the code dependency is not yet stored in the local memory cache of the application server. Some examples of the method, apparatus, and non-transitory computer-readable medium described above may further include processes, features, means, or instructions for retransmitting the remote resource network request to retrieve the code dependency.

In some examples of the method, apparatus, and non-transitory computer-readable medium described above, performing the loading process for the framework module comprises performing a set of pre-render tasks independent of the code dependency.

Some examples of the method, apparatus, and non-transitory computer-readable medium described above may further include processes, features, means, or instructions for loading application code, wherein the application code depends on the framework module. In some examples of the method, apparatus, and non-transitory computer-readable medium described above, loading the application code begins prior to completing the loading process for the framework module.

Some examples of the method, apparatus, and non-transitory computer-readable medium described above may further include processes, features, means, or instructions for receiving an execution request for the application code. Some examples of the method, apparatus, and non-transitory computer-readable medium described above may further include processes, features, means, or instructions for identifying whether the loading process for the framework module is complete. Some examples of the method, apparatus, and non-transitory computer-readable medium described above may further include processes, features, means, or instructions for determining whether to execute the application code based at least in part on the identifying.

Some examples of the method, apparatus, and non-transitory computer-readable medium described above may further include processes, features, means, or instructions for virtualizing the code dependency during the loading process for the framework module. Some examples of the method, apparatus, and non-transitory computer-readable medium described above may further include processes, features, means, or instructions for accessing the code dependency during execution of the framework module.

In some examples of the method, apparatus, and non-transitory computer-readable medium described above, the remote resource network request may be transmitted after beginning the loading process for the framework module. In other examples of the method, apparatus, and non-transitory computer-readable medium described above, the remote resource network request may be transmitted prior to beginning the loading process for the framework module.

In some examples of the method, apparatus, and non-transitory computer-readable medium described above, the remote resource network request comprises a fetching method using a fetch API, a data retrieval request using an object for server interaction, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for preemptively loading code dependencies at an application server, comprising:
    performing a loading process for a framework module, wherein the loading process comprises an initial framework request to retrieve a code dependency remotely over a network;
    transmitting a remote resource network request to retrieve the code dependency over the network prior to processing the initial framework request, the remote resource network request comprising an asynchronous function for loading the code dependency;
    intercepting the initial framework request based at least in part on processing the initial framework request and transmitting the remote resource network request, wherein intercepting the initial framework request comprises refraining from sending the initial framework request to retrieve the code dependency remotely over the network;
    replacing the asynchronous function with a mock implementation for the loading process;
    continuing the loading process based at least in part on the mock implementation;
    receiving the code dependency in response to the remote resource network request subsequent to the intercepting;
    storing the code dependency in a local memory cache of the application server in response to receiving the code dependency;
    accessing the code dependency for the loading process from the local memory cache in response to the intercepting; and
    resolving the mock implementation based at least in part on the accessed code dependency.

2. The method of claim 1, further comprising:
    completing the loading process for the framework module based at least in part on accessing the code dependency.

3. The method of claim 2, wherein completing the loading process for the framework module comprises:
    performing a set of post-render tasks dependent on the code dependency.

4. The method of claim 3, further comprising:
    determining that the code dependency is not yet stored in the local memory cache of the application server; and
    pausing the loading process prior to performing the set of post-render tasks based at least in part on the determining.

5. The method of claim 4, further comprising:
    resuming the loading process based at least in part on storing the code dependency in the local memory cache of the application server.

6. The method of claim 3, further comprising:
determining that the code dependency is not yet stored in the local memory cache of the application server; and
retransmitting the remote resource network request to retrieve the code dependency.

7. The method of claim 1, wherein performing the loading process for the framework module comprises:
performing a set of pre-render tasks independent of the code dependency.

8. The method of claim 1, further comprising:
loading application code, wherein the application code depends on the framework module.

9. The method of claim 8, wherein loading the application code begins prior to completing the loading process for the framework module.

10. The method of claim 8, further comprising:
receiving an execution request for the application code;
identifying whether the loading process for the framework module is complete; and
determining whether to execute the application code based at least in part on the identifying.

11. The method of claim 1, wherein replacing the asynchronous function with the mock implementation comprises virtualizing the code dependency during the loading process for the framework module, the method further comprising:
accessing the code dependency during execution of the framework module.

12. The method of claim 1, wherein the remote resource network request is transmitted after beginning the loading process for the framework module.

13. The method of claim 1, wherein the remote resource network request is transmitted prior to beginning the loading process for the framework module.

14. The method of claim 1, wherein the remote resource network request comprises a fetching method using a fetch application programming interface (API), a data retrieval request using an object for server interaction, or a combination thereof.

15. An apparatus for preemptively loading code dependencies at an application server, comprising:
a processor;
memory in electronic communication with the processor; and
instructions stored in the memory and executable by the processor to cause the apparatus to:
perform a loading process for a framework module, wherein the loading process comprises an initial framework request to retrieve a code dependency remotely over a network;
transmit a remote resource network request to retrieve the code dependency over the network prior to processing the initial framework request, the remote resource network request comprising an asynchronous function for loading the code dependency;
intercept the initial framework request based at least in part on processing the initial framework request and transmitting the remote resource network request, wherein intercepting the initial framework request comprises refraining from sending the initial framework request to retrieve the code dependency remotely over the network;
replace the asynchronous function with a mock implementation for the loading process;
continue the loading process based at least in part on the mock implementation;
receive the code dependency in response to the remote resource network request subsequent to the intercepting;
store the code dependency in a local memory cache of the application server in response to receiving the code dependency;
access the code dependency for the loading process from the local memory cache in response to the intercepting; and
resolve the mock implementation based at least in part on the accessed code dependency.

16. The apparatus of claim 15, wherein the instructions are further executable by the processor to cause the apparatus to:
load application code, wherein the application code depends on the framework module.

17. The apparatus of claim 16, wherein the instructions are further executable by the processor to cause the apparatus to:
receive an execution request for the application code;
identify whether the loading process for the framework module is complete; and
determine whether to execute the application code based at least in part on the identifying.

18. A non-transitory computer-readable medium storing code for preemptively loading code dependencies at an application server, the code comprising instructions executable by a processor to:
perform a loading process for a framework module, wherein the loading process comprises an initial framework request to retrieve a code dependency remotely over a network;
transmit a remote resource network request to retrieve the code dependency over the network prior to processing the initial framework request, the remote resource network request comprising an asynchronous function for loading the code dependency;
intercept the initial framework request based at least in part on processing the initial framework request and transmitting the remote resource network request, wherein intercepting the initial framework request comprises refraining from sending the initial framework request to retrieve the code dependency remotely over the network;
replace the asynchronous function with a mock implementation for the loading process;
continue the loading process based at least in part on the mock implementation;
receive the code dependency in response to the remote resource network request subsequent to the intercepting;
store the code dependency in a local memory cache of the application server in response to receiving the code dependency;
access the code dependency for the loading process from the local memory cache in response to the intercepting; and
resolve the mock implementation based at least in part on the accessed code dependency.

19. The non-transitory computer-readable medium of claim 18, wherein the instructions are further executable by the processor to:
load application code, wherein the application code depends on the framework module.

20. The non-transitory computer-readable medium of claim 19, wherein the instructions are further executable by the processor to:

receive an execution request for the application code;
identify whether the loading process for the framework module is complete; and
determine whether to execute the application code based at least in part on the identifying.

* * * * *